United States Patent
Bellorado et al.

(10) Patent No.: US 11,495,260 B1
(45) Date of Patent: Nov. 8, 2022

(54) STORAGE DEVICE THAT SWITCHES DETECTOR CONFIGURATION SETS BETWEEN DECODING ITERATIONS

(71) Applicant: Seagate Technology LLC, Fremont, CA (US)

(72) Inventors: Jason Bellorado, San Jose, CA (US); Marcus Marrow, San Jose, CA (US); Rishi Ahuja, Broomfield, CO (US); William M. Radich, Longmont, CO (US); Ara Patapoutian, Rancho Santa Fe, CA (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/353,245

(22) Filed: Jun. 21, 2021

(51) Int. Cl.
| | |
|---|---|
| *G11B 5/00* | (2006.01) |
| *G11B 5/09* | (2006.01) |
| *G11B 19/04* | (2006.01) |
| *G11B 5/008* | (2006.01) |
| *G11B 5/55* | (2006.01) |
| *G11B 5/73* | (2006.01) |
| *G11B 5/52* | (2006.01) |

(52) U.S. Cl.
CPC ........ *G11B 19/048* (2013.01); *G11B 5/00882* (2013.01); *G11B 5/52* (2013.01); *G11B 5/5539* (2013.01); *G11B 5/7375* (2019.05); *G11B 2005/0024* (2013.01); *G11B 2220/2516* (2013.01)

(58) Field of Classification Search
CPC .. G11B 5/09; G11B 5/02; G11B 27/36; G11B 2220/90; G11B 15/087; G11B 5/012; G11B 20/225; G11B 20/10009; G11B 5/00
USPC ... 360/25, 27, 31, 39, 55, 65, 76, 77.04, 46, 360/66
See application file for complete search history.

(56) References Cited

U.S. PATENT DOCUMENTS

| | | | |
|---|---|---|---|
| 6,275,346 B1 * | 8/2001 | Kim | G11B 27/36 360/31 |
| 6,920,005 B2 * | 7/2005 | Yun | G11B 27/36 360/53 |
| 7,009,792 B2 * | 3/2006 | Sakai | G11B 5/012 360/25 |
| 7,173,783 B1 | 2/2007 | McEwen et al. | |
| 9,093,083 B1 | 7/2015 | Kim et al. | |
| 9,397,698 B1 | 7/2016 | Burd et al. | |
| 10,084,553 B1 | 9/2018 | Bellorado et al. | |
| 10,445,171 B2 | 10/2019 | Jeong et al. | |

* cited by examiner

*Primary Examiner* — Nabil Z Hindi
(74) *Attorney, Agent, or Firm* — Mueting Raasch Group (57) ABSTRACT

A plurality of configuration sets are used with a detector coupled to a decoder. A processor is coupled to the memory registers and the detector and operable to load a first one of the configuration sets into the detector. The detector to attempts detection of the bits in the digital stream for a first iteration between the detector and the decoder using the first configuration set. After the first iteration, a second one of the configuration sets is loaded into the detector. The second configuration set is different than the first configuration set. The detector to attempts detection of the bits in the digital stream for a second iteration between the detector and the decoder using the second configuration set.

18 Claims, 4 Drawing Sheets

STORAGE DEVICE THAT SWITCHES DETECTOR CONFIGURATION SETS BETWEEN DECODING ITERATIONS

SUMMARY

The present disclosure is directed to a storage device that switches detector configuration sets between decoding iterations. In one embodiment, an apparatus includes memory registers storing a plurality of configuration sets. The apparatus also includes a detector operable to detect bits in a digital stream read from a data storage medium. A decoder of the apparatus is coupled to the detector and operable to decode the detected bits into user data. A processor of the apparatus is coupled to the memory registers and the detector and operable to: load a first one of the configuration sets into the detector; cause the detector to attempt detection of the bits in the digital stream for a first iteration between the detector and the decoder using the first configuration set; after the first iteration, load a second one of the configuration sets into the detector, the second configuration set different than the first configuration set; and cause the detector to attempt detection of the bits in the digital stream for a second iteration between the detector and the decoder using the second configuration set.

In another embodiment, a method involves loading a first configuration set from a memory register into a detector, the detector operable to detect bits in a digital stream read from a data storage medium. The detector attempts detection of bits in a digital stream for a first iteration between the detector and a decoder using the first configuration set. The decoder is operable to decode the detected bits into user data. After the first iteration, the method involves loading a second configuration set that is different than the first configuration set into the detector. The detector attempts detection of the bits in the digital stream for a second iteration between the detector and the decoder using the second configuration set. These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to data storage devices such as hard disk drives (HDDs). These drives stored data by applying a changing magnetic field from a recording head to the surface of a magnetic disk that is moving relative to the head. Some modern drives use energy assisted recording to enable higher areal density capacity (ADC) of stored data than would be possible with conventional recording (e.g., perpendicular magnetic recording). For example, heat-assisted magnetic recording (HAMR) used a laser to heat the recording medium, resulting in a hotspot where magnetic coercivity is lowered, allowing the applied magnetic field to only affect a small region to record the bits. Microwave assisted magnetic recording (MAMR) uses a spin torque oscillator to cause the magnetic particles at the disk surface to rotate making it easier to change their magnetic orientation.

Whatever technology is used to record the data, the same recording head or a different head generally includes a read transducer, e.g., magnetoresistive (MR) sensors that can read back the recorded data by translating the changing magnetic fields to analog electrical signals. The analog electrical signals are processed and conditioned, converted to digital data, and decoded to recover the stored data, which can then be sent to a requestor, e.g., a host computer, an internal controller, etc. The analog and digital paths used to record and read the data are generally referred to as the write and read channels.

One advantage provided by drives with increased ADC is that for a given rotational speed, a disk with higher ADC can also sustain higher data transfer rates. This is because the number of bits per track (sometimes referred to as bit density and measured in bits-per-inch, or BPI) is greater in a drive with higher ADC compared to a drive with lower ADC. Accordingly, the read and write channels in these drives will continue to develop improved signal and data processing capabilities to take advantage of these theoretically higher data transfer rates.

Figure 1:
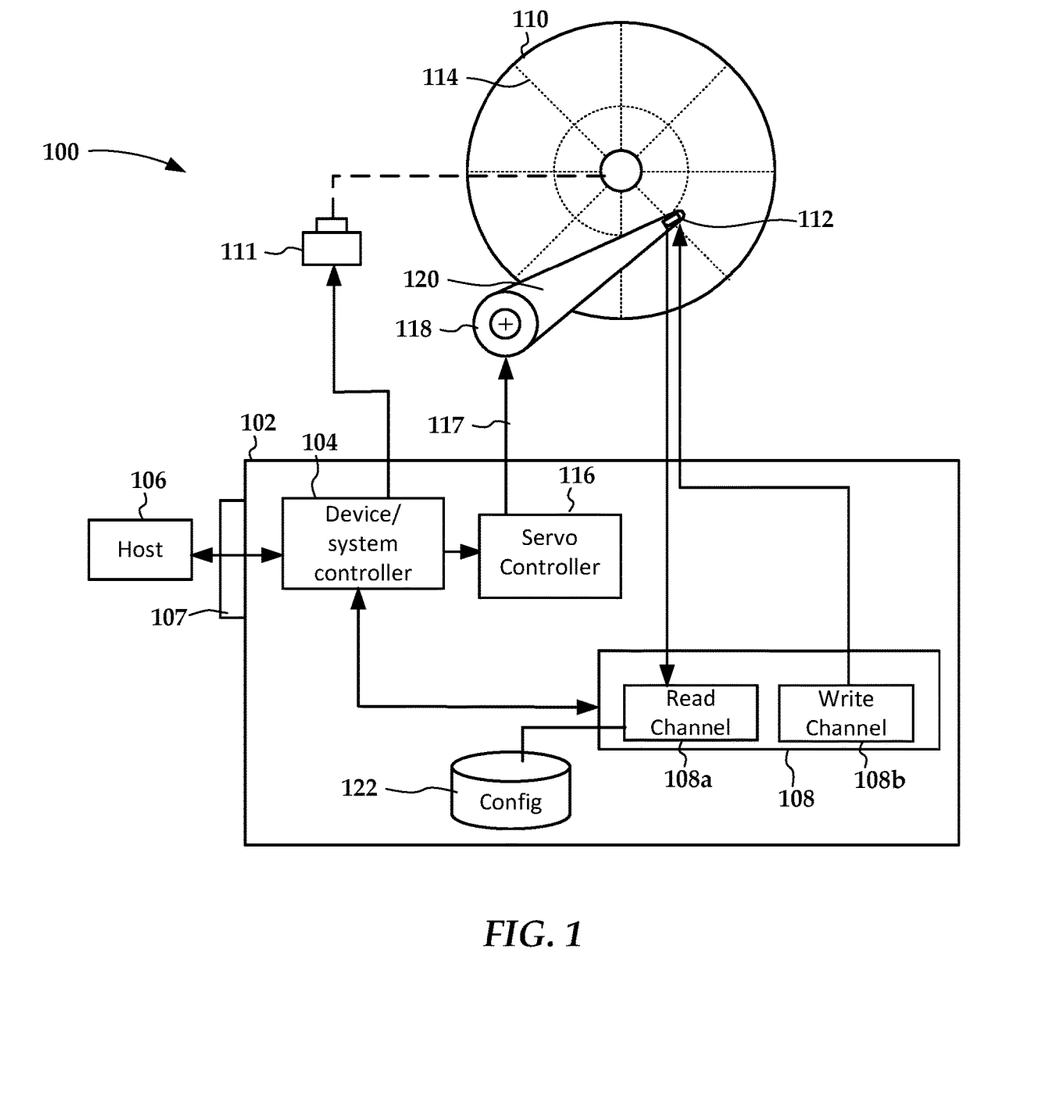
FIG. 1 is a block diagram of a data storage device according to an example embodiment.

In embodiments described below, a read channel used in an HDD is described that uses a detector and decoder. The detector attempts to recover the actual recorded data based on a converted digital signal, and the decoder validates the stream of bits, e.g., by applying error correction codes to the detected bits. The detector can utilize multiple configuration sets that are swapped out when processing the same segment of data. The configuration sets are targeted for different signal conditions (e.g., impairments, decoding progress), and therefore can speed the detecting and decoding of stored data and reduce the instances of failed detection/decoding. In order to understand the context in which the read channel may operate, FIG. 1 illustrates a block diagram a data storage apparatus 100 (e.g., HDD) that may utilize a read channel according to example embodiments.

The apparatus includes circuitry 102 such as one or more device/system controllers 104 that process read and write commands and associated data from a host device 106 via a host interface 107. The host interface 107 includes circuitry that enables electronic communications via standard bus protocols (e.g., SATA, SAS, PCI, NVMe, etc.). The host device 106 may include any electronic device that can be communicatively coupled to store and retrieve data from a data storage device, e.g., a computer, a server, a storage controller. The device controller 104 is coupled to one or more read/write channels 108 (shown here as separate read channel 108a and write channel 108b) that read from and write to a recording media, which in this figure are surfaces of one or more magnetic disks 110 that are rotated by a spindle motor 111.

The read/write channels 108 generally convert data between the digital signals processed by the device controller 104 and the analog signals conducted through one or more heads 112 during read and write operations. The heads 112 may include one or more read transducers each capable of reading one surface of the disk 110. The heads 112 may also include respective write transducers that concurrently write to the disk 110. The write transducers may be configured to write using a HAMR energy source, and may write in various track configurations, such as conventional tracks, shingled magnetic recording (SMR), and interlaced magnetic recording (IMR).

The read/write channels 108 may include analog and digital circuitry such as digital-to-analog converters (DACs), analog-to-digital converters, detectors, decoders, timing-recovery units, error correction units, etc. The read/write channels 108 are coupled to the heads 112 via interface circuitry that may include preamplifiers, filters, etc. Additional details of the read channel 108a will be described in greater detail below.

In addition to processing user data, the read/write channels 108 read servo data from servo marks 114 on the magnetic disk 110 via the read/write heads 112. The servo data are sent to one or more servo controllers 116 that use the data to provide position control signals 117 to one or more actuators, as represented by voice coil motors (VCMs) 118. In response to the control signals 117, the VCM 118 rotates an arm 120 upon which the read/write heads 112 are mounted. The position control signals 117 may also be sent to microactuators (not shown) that individually control each of the heads 112, e.g., causing small displacements at each read/write head.

As seen in this view, the read channel 108a is coupled to memory 122 that may include a set of memory registers provided on an application-specific integrated circuit (ASIC), system-on-a-chip (SoC), or the like. The memory 122 stores detector configuration data which can be used as described in greater detail below. The memory 122 may be volatile memory (e.g., dynamic random access memory, or DRAM) that is part of a larger memory subsystem of the circuitry 102.

The data retrieval operations conducted by the apparatus 100 begin by passing a read transducer of the head 112 (e.g., a MR read element) over a stored location (e.g., track and sector) to generate an electrical current indicative of the magnetic polarity of the nearby media 110. The electrical current is passed to the read channel subsystem 108a (also referred to herein as the channel) contained on the controller ASIC to perform signal processing, detection, estimation, and error-correction functions required to reliably reproduce the written sequence. The efficacy with which the channel 108a is able to recover stored data has wide-ranging implications to the HDD operation, including latency, throughput, and data integrity. As a result, a significant amount of attention has been spent optimizing the operation of the read channel 108a.

In order to achieve the best possible performance, the read channel operation can be specifically tailored to the head 112, media 110, and location from which data is being retrieved (e.g., radially-defined zones of each disk surface). To allow for this flexibility, the channel's functionality is implemented such that it governed by a large set of configurable parameters. During the manufacturing test process, an optimal set of channel parameters may selected for each data zone, e.g., by reading and writing test data to the zones. Each zone includes a collection of nearby data tracks for which the read-back signal characteristics are assumed to be similar. This approach has proven effective at allowing for reliable data storage at increasingly high areal densities.

The demonstrated effectiveness of a channel employing targeted parameter sets arises from the highly non-uniform nature of the characteristics of the read-back signal. Because read heads, magnetic disks, and controller ASICs are produced through semiconductor manufacturing processes, they are subject to its inherent variations. Even within the surface of a single disk the ramping data-rate utilized from the inner-diameter to the outer-diameter of the disk can add to the non-uniformity of the read-back signal over different regions. Although the use of zone-specific parameter sets does address the signal non-uniformity caused by these factors, there are also other factors for which this approach cannot be used. Processes such as weak-writes, thermal decay, adjacent track interference, aging/wear of components, etc., alter the read-back signal properties from those observed during manufacturing. As a result, optimized parameter sets are rendered less effective and, therefore, additional margin may be built into a manufactured HDD, in the form of a reduced areal density, to ensure the integrity of stored data.

Embodiments described herein include a methodology which can be hardware-based and reduces the difficulties encountered when the read-back signal characteristics are altered from those observed during manufacturing. In contrast to existing approaches to this problem, the proposed methodology can be used in a real-time manner, thus minimizing the time it takes for data recovery. As a result, use of the proposed architecture allows for a removal of excess drive margin that may be applied to ensure data integrity, directly leading to a higher areal density capability.

Optimizing the parameters that govern the operation of the read channel may involve writing data (e.g., test tracks with known test data patterns) to the disk and reading the data back to adjust the channel parameters to better handle the observed read back signal characteristics. The optimization of some channel parameters is accomplished by sweeping them through a range of values, either independently or jointly with other parameters, while monitoring a figure-of-merit such as bit error-rate (BER). For other channel parameters with the capability of self-adaptation, the read operation itself allows for convergence to their optimized values.

The full channel optimization procedure can be carried out for each data zone to generate a set of parameters to be used for all subsequent data retrieval operations. Ideally, these parameters will be effective at recovering data read from their associated zones. In practice, however, there are many commonly-occurring impairments that cause the observed signal characteristics to deviate from that observed during manufacturing. One type of impairment is a weak write associated with a write operation. The write operation involves passing a write element (e.g., magnetic coil and pole) over the media to impart a desired magnetization through an applied magnetic field. In some circumstances the magnetic field may be too weak to adequately saturate the media, a situation often induced by a larger than-expected head-to-media spacing. For energy-assisted magnetic recording, in which the write operation is facilitated by an applied energy source, weak writes often occur when the applied energy is insufficient to adequately assist the write operation.

Another impairment that may affect HDD data read back is adjacent track writing. In this case, the magnetic field utilized to conduct a write operation may have the undesirable effect of altering the magnetic polarity of the media adjacent to the intended write location. In some situations, this may be caused by the applied field being and/or assisted energy being too high. This effect is worsened with increasing track density and number of writes conducted to adjacent tracks. This type of impairment is also referred to as adjacent track interference (ATI).

Another phenomenon which can alter the readback signal characteristics is track mis-registration (TMR). Ideally, the written servo pattern is utilized to write parallel tracks and to place the reader directly over the written track center. In practice, this is not always accomplished perfectly. During write operations, TMR can cause tracks to be written closer than expected, exacerbating the aforementioned degradation (e.g., ATI) associated with adjacent track writes. During read operations, TMR may cause the read head location to deviate from the written track center, reducing the signal-to-noise ratio (SNR) and allowing for more significant pick-up from adjacent tracks.

Another impairment that may affect HDD data read back is thermal decay. After data is written to the disk, thermal agitation may cause magnetic grains to change polarity relative to that imposed during the write operation. This effect is worsened at increasing temperature and will have a larger impact on those written data patterns that are less magnetically stable.

Since some channel parameters have the ability to self-adapt, this adaptation can be utilized to adjust the parameters to compensate for altered read back signal characteristics. Some channel parameters are able to adapt using estimates of the written data pattern as they are tolerant to the decision errors that are inherent to the estimation process. This type of adaptation, referred to as decision-directed adaptation, may be continuously run using decisions generated by any implemented detector. The adaptation of other channel parameters, however, is sensitive to decision errors and, thus, cannot be driven by the output of a detector. This type of adaptation, referred to as data-aided adaptation, can readily be run in manufacturing since the written data pattern is known to the channel, thus a reference set of data will always be available for the adaptation. Its use in normal drive operation, in which data are unknown, is not as straightforward.

A commonly-employed approach to running data-aided adaptation in normal operation is to use the output of the error-control coding (ECC) decoding operation, as it can be assumed to be error-free whenever the decoding is successful. For example, a certain percentage of bits in the decoded block can be incorrectly read by the detector, but nonetheless the data can be recovered due to error correction codes (ECC) used by the decoder. The ECC can determine which bits were flipped in the detection process, and these incorrectly detected bits can give clues as to the nature of the detector errors.

This approach cannot be used when the decoding operation is not successful (e.g., too many errors to be recovered by ECC), because the data cannot be assumed error-free. As a result, undecodable sectors can't be used to support the adaptation of channel parameters that are intolerant of decision errors. This creates a gap in the ability adjust the channel parameters to match the signal characteristics for low SNR sectors. It is, however, these sectors that are most in need of fully optimized channel parameters. It has been shown that the parameters requiring data-aided adaptation are the most effective at improving the channel performance for a given channel condition.

In some systems, the factory-set channel parameters are optimized for a predetermined set of read-back signal impairments. For example, the adjacent track write impairment may be induced in manufacturing test by writing the adjacent track(s) (potentially multiple times) to create an impaired condition for channel parameter optimization. The channel parameters may then be optimized in this condition utilizing the known written data pattern. The optimized channel parameters (or, typically, a subset thereof) are saved such that they can be retrieved and utilized, if required, during normal drive operation. In such a system, an ECC decoding failure may prompt the FW to select one of the saved parameter sets for use in subsequent re-reads of the offending sector(s), where the parameter set selected is that deemed to be the most probable to successfully recover the sector. Failure to decode successfully can induce additional parameter selections and additional reads/decoding attempts.

Although the above-described methodology had been shown effective, it does have shortcomings, particularly in the context of today's HDD applications. Although the ability to recover data by any means necessary (e.g., emphasizing data integrity) is useful, in many applications the concept of command completion time (CCT) is becoming as, if not more, important. The CCT is generally stated a time limit for returning stored data, where only a small percentage (e.g., 1 per 1000) of commands may exceed this limit. Since commands are often queued to a storage device, any improvement in the time to complete a given read command will also apply to all commands that follow it in the queue. As a result, methods capable of reducing data recovery time will also assist in meeting CCT requirements.

The issues inherent in the methodology described above are with respect to the speed and efficacy of the data recovery operation. First of all, the proposed approach waits for a decoding failure before new channel parameters, which are deemed more suitable to recover the sector failure, are selected for use. As such, this approach will incur a reread and, possibly, multiple rereads if the parameter selection methodology takes multiple attempts to find a suitable parameter set. Furthermore, this approach does not fit well into the paradigm of multi-sector error recovery (MSER), a component in meeting CCT requirements, in which multiple failed sectors on a track are all read each revolution to attempt their simultaneous recovery. In practice, each of the failed sectors may suffer from a different impairment and, thus, reprogramming parameters during this multi-sector read is difficult. As a result, only sectors suffering from a given impairment could be targeted for recovery on each revolution, elongating the overall recovery time.

Finally, the approach of applying a new parameter set to the next read of a sector based on the characteristics of the previous read does not always work well. Some noise sources, such a read TMR, may be non-repeatable (e.g., they can differ from read-to-read) and, thus, the properties of a prior read may not accurately predict the properties of subsequent reads.

In this disclosure, an apparatus and method are described which address the problems detailed in the preceding sections. For example, selecting different parameter sets governing the operation of the SOVA detector which, when matched to the characteristics of the readback signal, has proven effective at improving the channel performance. The adaptation of these parameters, however, is data aided and, therefore, cannot be applied to sectors that are unable to successfully decode. Embodiments described herein use a similar approach in that sets of SOVA parameters are optimized, e.g., during manufacturing under different impairments. However, in the described embodiments, a plurality of the parameter sets are programmed to registers such that they are all potentially available to the hardware during the iterative decoding process.

The parameter sets in such an embodiment are switched into the SOVA to be used as the decoding operation progresses. Three embodiments are described in the following that provide a tradeoff of complexity and efficacy, and to address different possible configurations of the iterative decoder. Use of the apparatuses and methods described herein allows for real-time recovery from channel impairments that would otherwise render a sector unrecoverable (or recoverable after a significantly longer period of time). As such, employing the proposed architecture allows for a relaxation of the areal density margin currently used to ensure data integrity against the degraded channel performance caused by changing signal characteristics.

Figure 2:
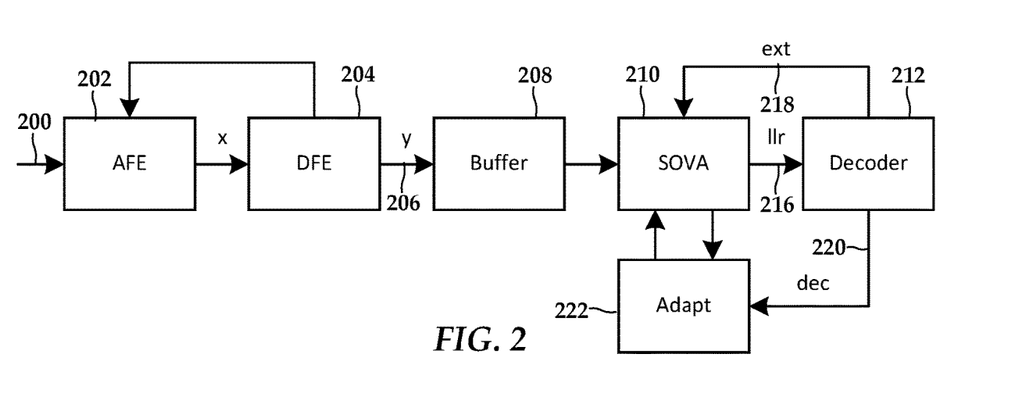
FIGS. 2-5 are block diagrams of read channels according to example embodiments.

In FIG. 2, a block diagram shows a read channel which includes features that may be common to any of the embodiments described herein. As shown, a read-back signal 200 is first applied to an analog front-end (AFE) 202 for continuous-time signal processing and sampling by an analog-to-digital converter (ADC) (not shown). The resulting digitized sample sequence (x) is then applied to a digital front-end (DFE) 204, which conducts various digital signal processing techniques (in addition to generating control values back to the AFE) and generation of the equalized sample sequence (y) 206. The sequence 206 is then applied to a buffer 208 for storage, which arises from the iterative nature of most modern decoding algorithms. Here, the latency of decoding operation may vary from sector-to-sector, where sectors with more errors take longer to decode than sectors with fewer errors. As a result, samples from subsequent sectors require storage while previous sectors occupy the decoder hardware so as to allow for its efficient usage.

Although there are variations on how the remainder of the channel may be implemented, they may at least include a detector 210 (depicted as soft-output Viterbi algorithm or SOVA) and a decoder 212 which operate in an iterative manner. Here, the SOVA 210 generates probabilities 216, known as log likelihood ratios (llr), which it passes to the decoder 212 for use in its error correction operation. The decoder processes the data and passes information back to the SOVA 210 in the form of extrinsic information (ext) 218, which the SOVA 210 utilizes in its subsequent detection operation. The process continues until the sector decodes successfully or until a maximum number of iterations are reached without success, after which failure is declared.

If the decoder 212 is able to successfully recover the written data sequence it passes the resulting data (dec) 220 to the adapt module 222. Here, the output of the SOVA 210 operation is used along with the decoded data 220 to perform the data-aided adaptation of the various parameters that govern the operation of the SOVA detector 210. If the decoder 212 is unable to successfully recover the data, then no adaptation may be conducted for that sector.

In this disclosure it is assumed N sets of SOVA parameters (also referred to herein as "configuration sets") are available, which is denoted by ps1, ps2, ..., psN, herein. In the context of addressing the previously described problem, the N configuration sets could be the result of SOVA parameter optimization for N different signal impairments. However, in some embodiments parameter sets may cover other decoding states besides impairments, e.g., iteration-specific parameter sets that can be used at different stages of decoding if more than a few iterations are needed. In such a case, a first configuration set may be used at the start of decoding, and a second configuration set used in a later iteration that will ultimately speed the decoding process compared to using just the first configuration set. The method for generating these SOVA parameters is beyond the scope of this disclosure. As noted above, this can be done in qualification testing by simulating different types of impairments to the recorded data and/or read-back signal and/or by trying different configurations at different stages of decoding regardless of signal impairment. This method of obtaining parameter sets is exemplary and not meant to be limiting.

Figure 3:
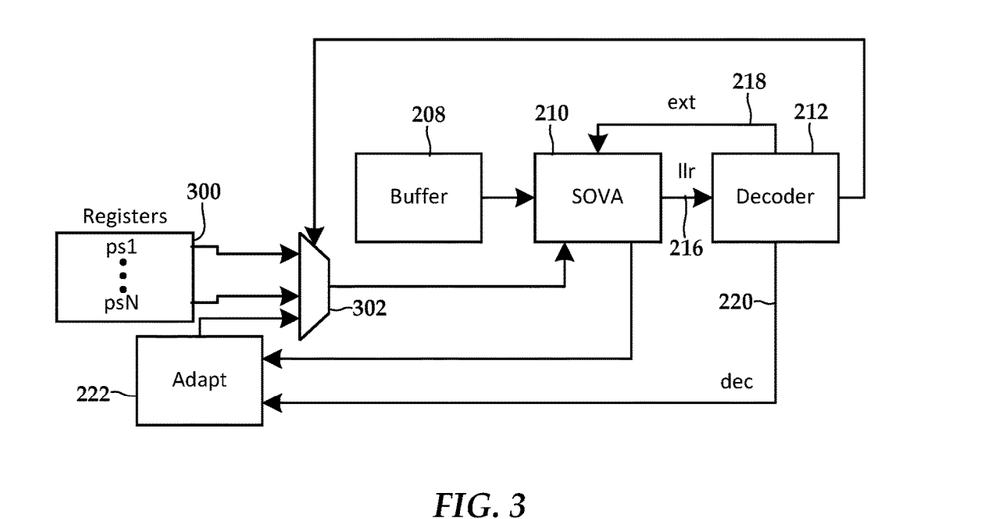

The first embodiment of the proposed methodology is depicted in FIG. 3, in which N sets of SOVA parameters (ps1, ps2, ..., psN, where N>1) is stored into a register 300 such that it is available during the decoding operation of each sector. When the decoding operation begins, a switching unit (e.g., multiplexer 302) selects the bottom input, passing the adapted version of SOVA parameters, as generated by the adapt module 222, to the SOVA detector 210 for use in its operation. The parameters are sorted in the register 300 based on a likelihood of an impairment for which each configuration set is optimized, such that the configuration sets associated with a most likely of the impairments are used first by the detector 210. Note that in the case of N=1, the detector 210 may already have a default set of parameters loaded by default, such that configuration set changes can still be made during decoding by switching in and out the single configuration set stored the register 300 via multiplexer 302.

For normal sectors (e.g., sectors with signal characteristics consistent with the adapted parameters) the decoder should succeed after only a few operations. For sectors suffering from impairments or with inconsistent signal characteristics, the decoding process might take longer to complete or may never complete successfully. In the proposed methodology, after a programmed number of iterations (or after meeting some other convergence criterion), the decoder 212 will change the control to the multiplexer 302 to allow a different set of SOVA parameters to be switched into the SOVA detector 210 for use. This process would continue by continually swapping in new parameter sets after a programmed number of iterations is completed without success, or based on some other convergence criterion.

Note that the change in parameter sets from the multiplexer 302 causes a change in the overall behavior of detector 210, allowing it to re-read from the buffer using a new parameter set each time without having to re-read the data from the media. Generally, the parameter sets stored in the register 300 are those that define the operation of the SOVA detector. Specifically, they can be one or more of the SOVA branch biases, pattern dependent noise prediction (DDNP) filter coefficients, and a-priori branch probabilities.

The embodiment in FIG. 3 allows the use of all impairment-specific SOVA parameter sets throughout the course of the decoding operation on the first read. In addition, since this process is conducted for each sector applied to the decoding hardware, it is also effective even if each sector being read suffers from a different impairment. This embodiment is relatively straightforward to implement, however may have reduced performance under some conditions. For example, if the iterative decoding hardware is designed to support a maximum number of averaged iterations, then applying any more iterations than required to decode a sector will needlessly consume hardware resources and could cause decoding failure. This would be the case if, for example, the final parameter set is the most effective parameter set for all sectors being read. The order of programmed parameters may be such that they are in decreasing order of statistical efficacy, however, even such an approach cannot address situations in which different sectors have different optimal parameter sets.

Figure 4:
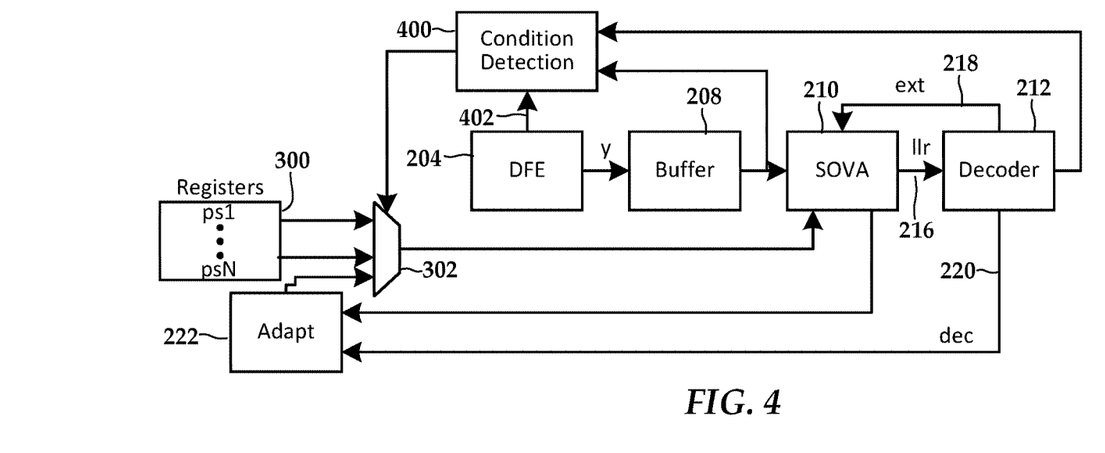

The block diagram in FIG. 4 is a second embodiment with additional features that address some of the issues identified above for the embodiment depicted in FIG. 3. In FIG. 4, a condition detection module 400 takes equalized samples as they are passed from the sample buffer 208 used by the iterative decoding procedure, and DFE channel parameters 402 as input to make a determination as to what SOVA channel parameters to utilize. In some embodiments, the condition detection module 400 may re-evaluate and re-order/re-sort the use of impairment-specific parameter sets such that they are utilized according to their probability of generating a decoding success. In other embodiments, the condition detection module 400 may select the parameter set at each iteration to maximize the probability of decoding success. Note that, in the latter case, this may entail using a single parameter set during the entire decoding operation if it is deemed advantageous to do so.

An advantage that the embodiment shown in FIG. 4 has is that the parameter selection process depends on the characteristics of the sector on which a decoding attempt is being made as opposed to a predetermined probability that each parameter set will be effective. For any methodology employed for the condition detection module 400, the utilized parameter selection procedure will be able to recover sectors without wasting iterations on parameter sets that are not useful for a particular sector. As a result, this architecture is more efficient in it use of the available hardware resources.

In the previous discussion, the samples stored in the buffer were considered as static in that they are written after processing by the DFE 204 and remain unchanged throughout the decoding procedure. It has been shown that there are distinct advantages to using the most up-to-date decisions available from the decoder 212 to pre-process samples as they are read from the buffer 208 to the iterative decoder. In such an embodiment, this could be done each decoder iteration (or every M iterations) and, therefore, the samples applied to the SOVA 210 continually change through the process. To address this situation, the third proposed embodiment is depicted in the block diagram of FIG. 5. Here, a process module 500 (also referred to herein as a "pre-processor") has been added between the buffer 208 and the SOVA 210 for pre-processing of samples, which also provides input to the condition detection module 400. The process module 500 may perform an action such as ATI cancellation to the samples, in which the reader pickup from an adjacent track is estimated and cancelled from the stored samples. The process module may compensate for other anomalies, such as DC offset and timing errors. Therefore, the selected parameter set selected from the registers 300 should also be based on this correction applied to the samples via the process module 500.

Figure 5:
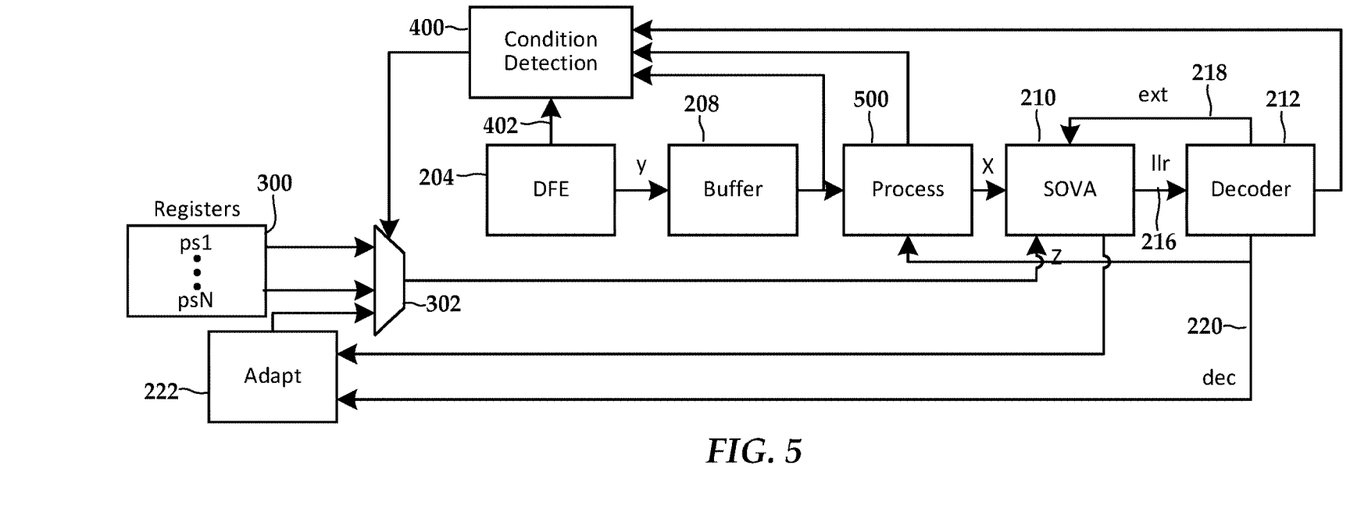

Note the distinction between this embodiment and the previously proposed embodiments, in which the SOVA parameter selection was based only on the condition of the stored samples, whereas this selection is based on their condition as well as an action taken to modify those samples from their original form. This can allow for an even more optimized selection of channel parameters than from previous proposals. In this context, the stored parameters could also be optimized during manufacturing by creating the channel condition as well as the associated action applied to the samples.

Finally, note that the utility of the proposed hardware architecture goes beyond the automated use of impairment-specific SOVA parameter sets. As previously discussed, it is possible that the applied samples change each decoding iteration and, as should be evident in all iterative decoding procedures, the information passed to SOVA from the decoder (ext) also modifies the operation of the SOVA. As a result, the parameters that are optimal for one iteration may not be optimal for earlier or later iterations. Even outside the scope of using modified parameter sets for different channel impairments, the proposed architecture is well suited to utilizing iteration-dependent parameters to improve the channel performance, e.g., speed up the convergence for high quality signals as well as lower quality signals.

Figure 6:
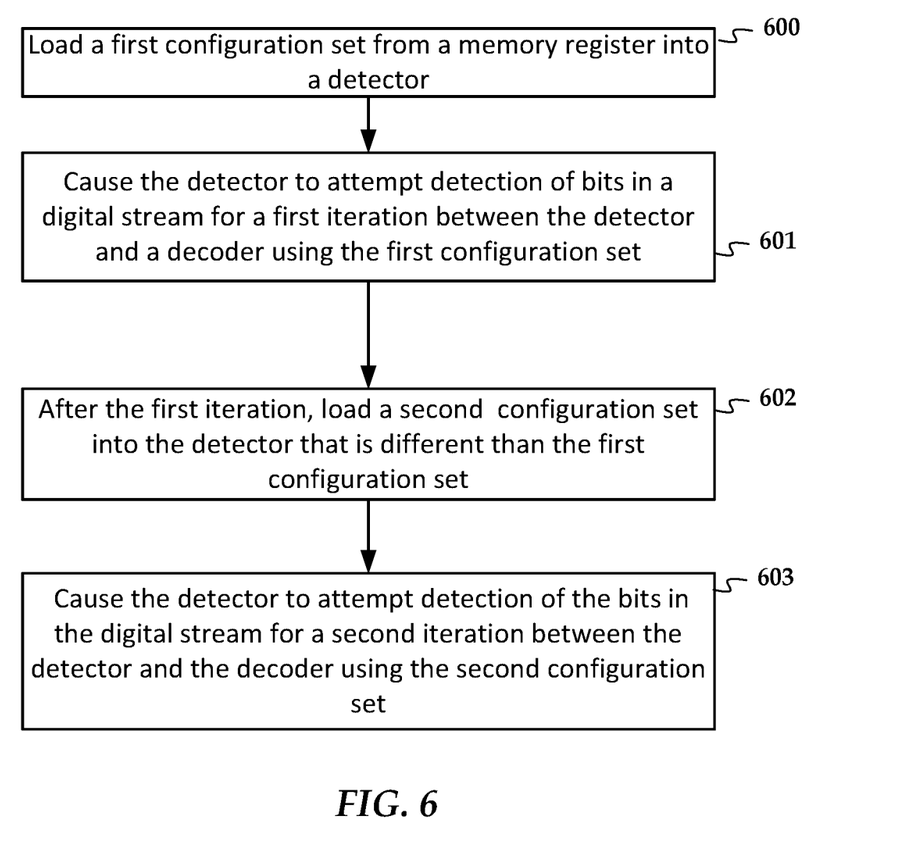
FIG. 6 is a flowchart of a method according to an example embodiment.

In FIG. 6, a flowchart illustrates a method according to an example embodiment. The method involves loading 600 a first configuration set from a memory register into a detector. The detector is operable to detect bits in a digital stream read from a data storage medium. The detector attempts 601 detection of bits in a digital stream for a first iteration between the detector and a decoder using the first configuration set. The decoder is operable to decode the detected bits into user data. After the first iteration, a second configuration set is loaded 602 into the detector that is different than the first configuration set. The detector to attempts 603 detection of the bits in the digital stream for a second iteration between the detector and the decoder using the second configuration set. Note that the terms "first iteration" and "second iteration" are merely meant to denote two subsequent detector/decoder iterations using different configuration sets, and are not meant to imply that the first iteration is the very first iteration of the decoding sequence. Nor is this meant to imply that the first and second iterations are immediately adjacent. For example, additional iterations after the first iteration may be performed using the first configuration set before the second configuration set is loaded and used for the second (and possibly subsequent) iterations.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:
1. An apparatus comprising:
a memory register storing one or more configuration sets;

a detector operable to detect bits in a digital stream read from a data storage medium;

a decoder coupled to the detector and operable to decode the detected bits into user data; and a processor coupled to the memory registers and the detector and operable to:

cause the detector to attempt detection of the bits in the digital stream for a first iteration between the detector and the decoder using a first configuration set in the detector;

after the first iteration, load a second one of the configuration sets into the detector from the memory register, the second configuration set different than the first configuration set; and cause the detector to attempt the detection of the bits in the digital stream for a second iteration between the detector and the decoder using the second configuration set, wherein the detector determines a convergence criterion for multiple iterations between the detector and the decoder using the first configuration set, wherein the second configuration set is used for subsequent iterations based on the convergence criterion not being met.

2. The apparatus of claim 1, wherein the convergence criterion comprises a maximum number of iterations using the first configuration set.

3. An apparatus comprising:

a memory register storing a plurality of configuration sets;

a detector operable to detect bits in a digital stream read from a data storage medium, the plurality of configuration sets being sorted in the memory register based on a likelihood of an impairment for which each configuration set is optimized such that the configuration sets associated with a most likely of the impairments are used first by the detector;

a decoder coupled to the detector and operable to decode the detected bits into user data; and a processor coupled to the memory registers and the detector and operable to:

cause the detector to attempt detection of the bits in the digital stream for a first iteration between the detector and the decoder using, in the detector, a first configuration set of the plurality of configuration sets;

after the first iteration, load a second one of the plurality of configuration sets into the detector from the memory register, the second configuration set different than the first configuration set; and cause the detector to attempt the detection of the bits in the digital stream for a second iteration between the detector and the decoder using the second configuration set.

4. The apparatus of claim 3, further comprising a condition detection module that monitors the digital stream and provides an estimate of a type of impairment affecting a current segment of data being input to the detector, the apparatus configured to re-sort the plurality of configuration sets in the memory registers based on the estimated type of impairment.

5. The apparatus of claim 4, further comprising a pre-processor that receives the digital stream before it enters the detector, the pre-processor enhancing the digital stream based on the estimated type of impairment and outputting the enhanced digital stream in the detector.

6. The apparatus of claim 5, wherein the condition detector re-evaluates the estimate of the type of impairment for each iteration between the detector and the decoder; the re-evaluation changing at least one of the pre-processor enhancement and the sorting of the plurality of configuration sets in the memory registers.

7. The apparatus of claim 1, wherein the one or more configuration sets are obtained by characterizing a performance of the detector and the decoder using known test data.

8. The apparatus of claim 7, wherein the known test data includes simulated impairments to the digital stream.

9. The apparatus of claim 1, wherein the first and second configuration sets are optimized for different stages of decoding of the digital stream.

10. A method comprising:

characterizing a performance of a detector and a decoder using known test data to determine first and second configuration sets;

causing the detector to attempt detection of bits in a digital stream read from a data storage medium for a first iteration between the detector and the decoder using the first configuration set in the detector, the detector operable to detect the bits in the digital stream and the decoder operable to decode the detected bits into user data;

after the first iteration, loading the second configuration set that is different than the first configuration set from a memory register into the detector; and causing the detector to attempt the detection of the bits in the digital stream for a second iteration between the detector and the decoder using the second configuration set.

11. The method of claim 10, wherein the detector determines a convergence criterion for multiple iterations between the detector and the decoder using the first configuration set, wherein the second configuration set is used for subsequent iterations based on the convergence criterion not being met.

12. The method of claim 11, wherein the convergence criterion comprises a maximum number of iterations using the first configuration set.

13. The method of claim 10, wherein a plurality of configuration sets are sorted in the memory registers based on a likelihood of an impairment for which each configuration set is optimized such that the configuration sets associated with a most likely of the impairments are used first by the detector.

14. The method of claim 13, further comprising:

monitoring the digital stream and providing an estimate of a type of impairment affecting a current segment of data being input to the detector; and re-sorting the plurality of configuration sets in the memory registers based on the estimated type of impairment.

15. The method of claim 14, further comprising enhancing the digital stream based on the estimated type of impairment and outputting the enhanced digital stream in the detector.

16. The method of claim 15, further comprising re-evaluating the estimate of the type of impairment for each iteration between the detector and the decoder, the re-evaluation changing at least one of the enhancement and the sorting of the plurality of configuration sets in the memory registers.

17. The method of claim 10, wherein the known test data includes simulated impairments to the digital stream.

18. The method of claim 10, wherein the first and second configuration sets are optimized for different stages of decoding of the digital stream.

* * * * *

UNITED STATES PATENT AND TRADEMARK OFFICE
CERTIFICATE OF CORRECTION

| | |
|---|---|
| PATENT NO. | : 11,495,260 B1 |
| APPLICATION NO. | : 17/353245 |
| DATED | : November 8, 2022 |
| INVENTOR(S) | : Jason Bellorado et al. |

It is certified that error appears in the above-identified patent and that said Letters Patent is hereby corrected as shown below:

On the Title Page

Item [57], Line 4, "to" should be deleted.

Item [57], Line 10, "to" should be deleted.

In the Claims

In Claim 1 Line 7, the word 'hits' should be -- bits --.

In Claim 6 Line 67, 'decoder;' should be -- decoder, --.

Signed and Sealed this
Eleventh Day of April, 2023

Katherine Kelly Vidal
*Director of the United States Patent and Trademark Office*